June 17, 1930.  C. V. HEAD  1,765,154
BUILDING CONSTRUCTION
Filed Dec. 3, 1927   5 Sheets-Sheet 1
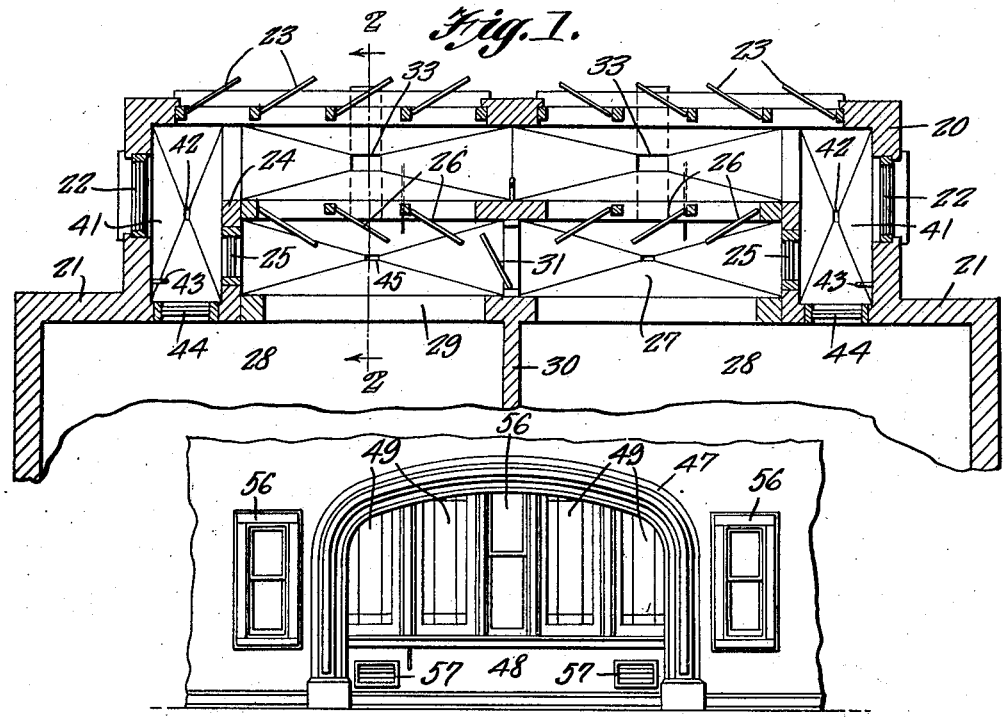
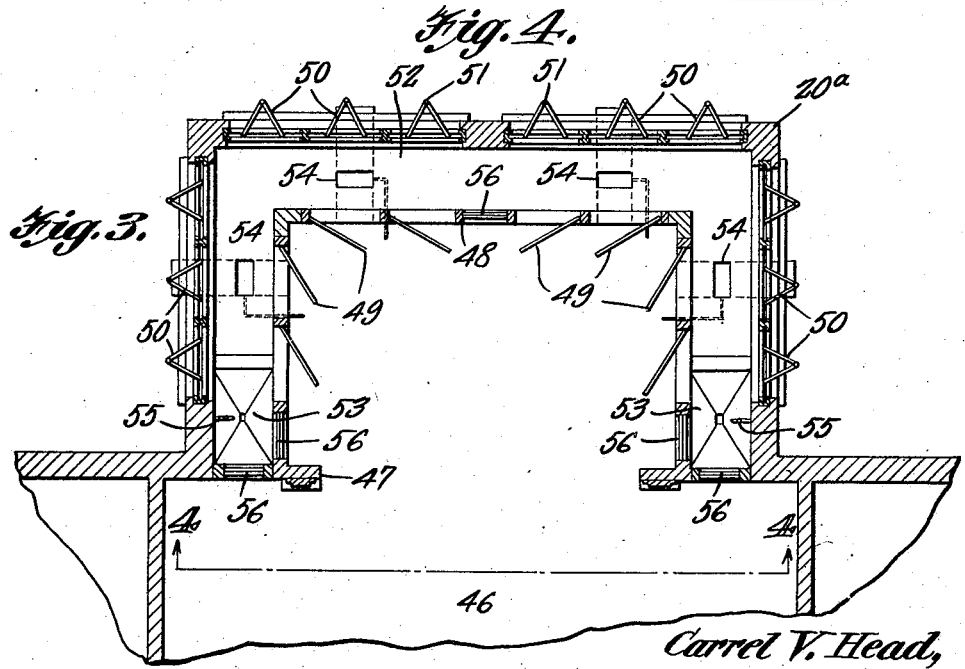

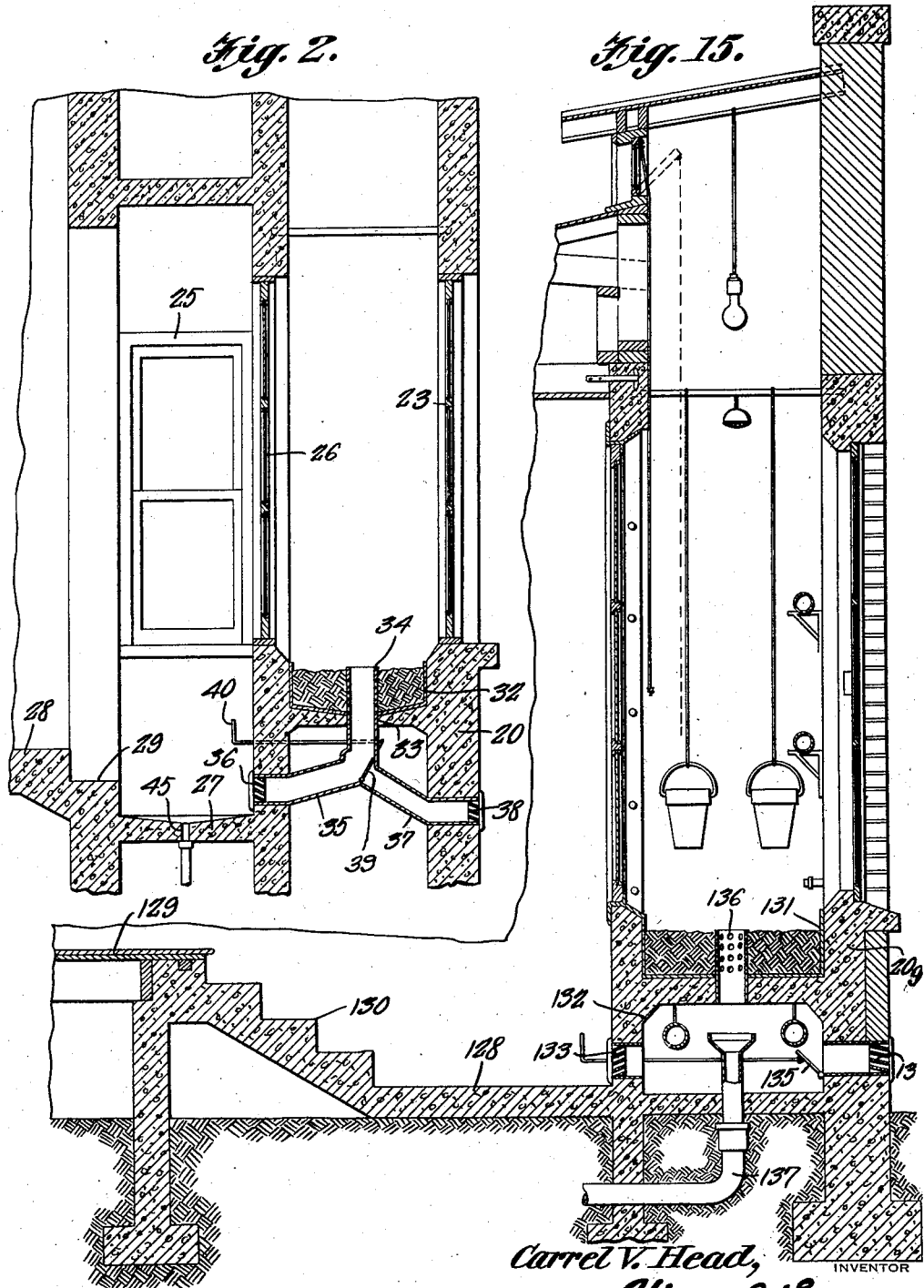

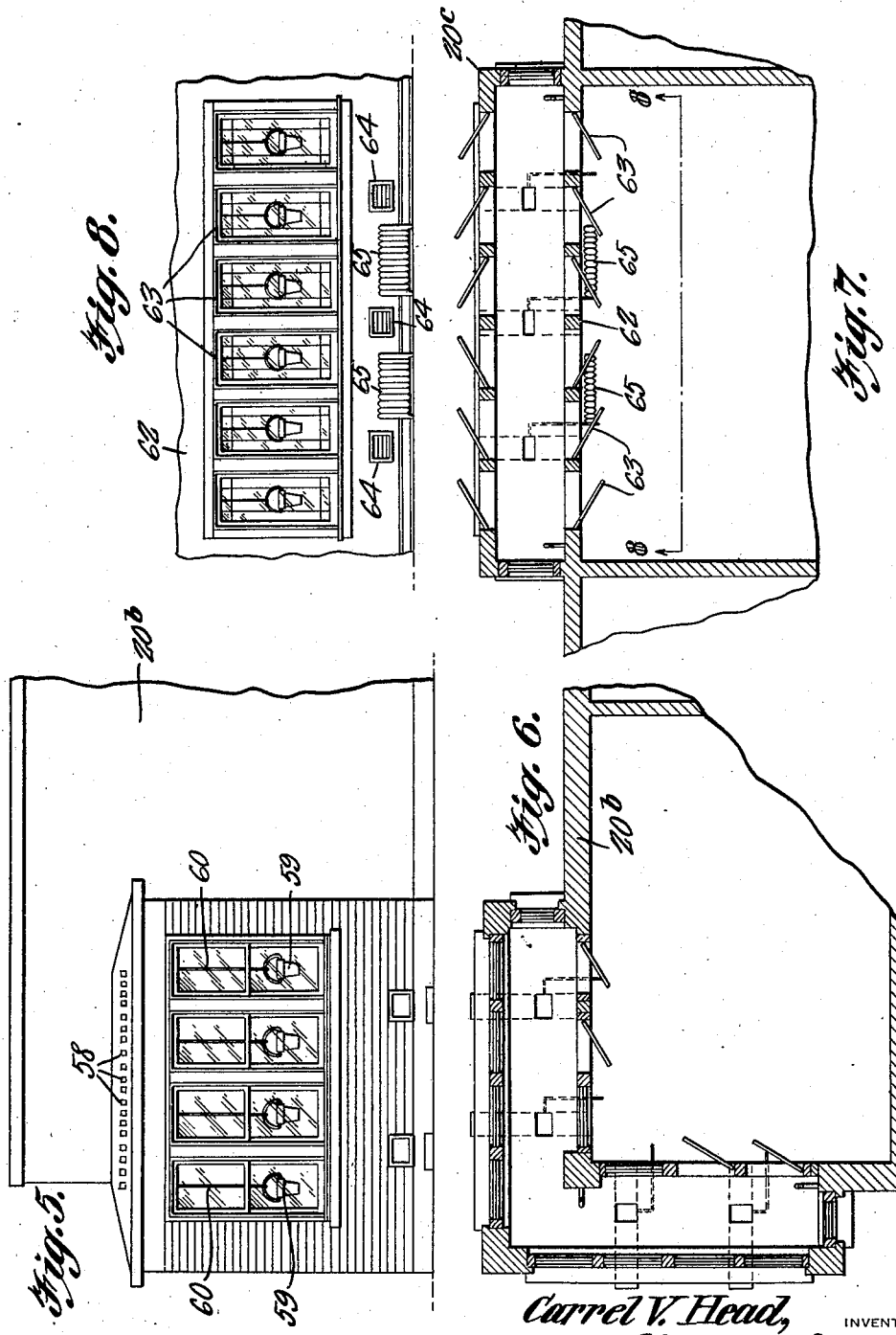

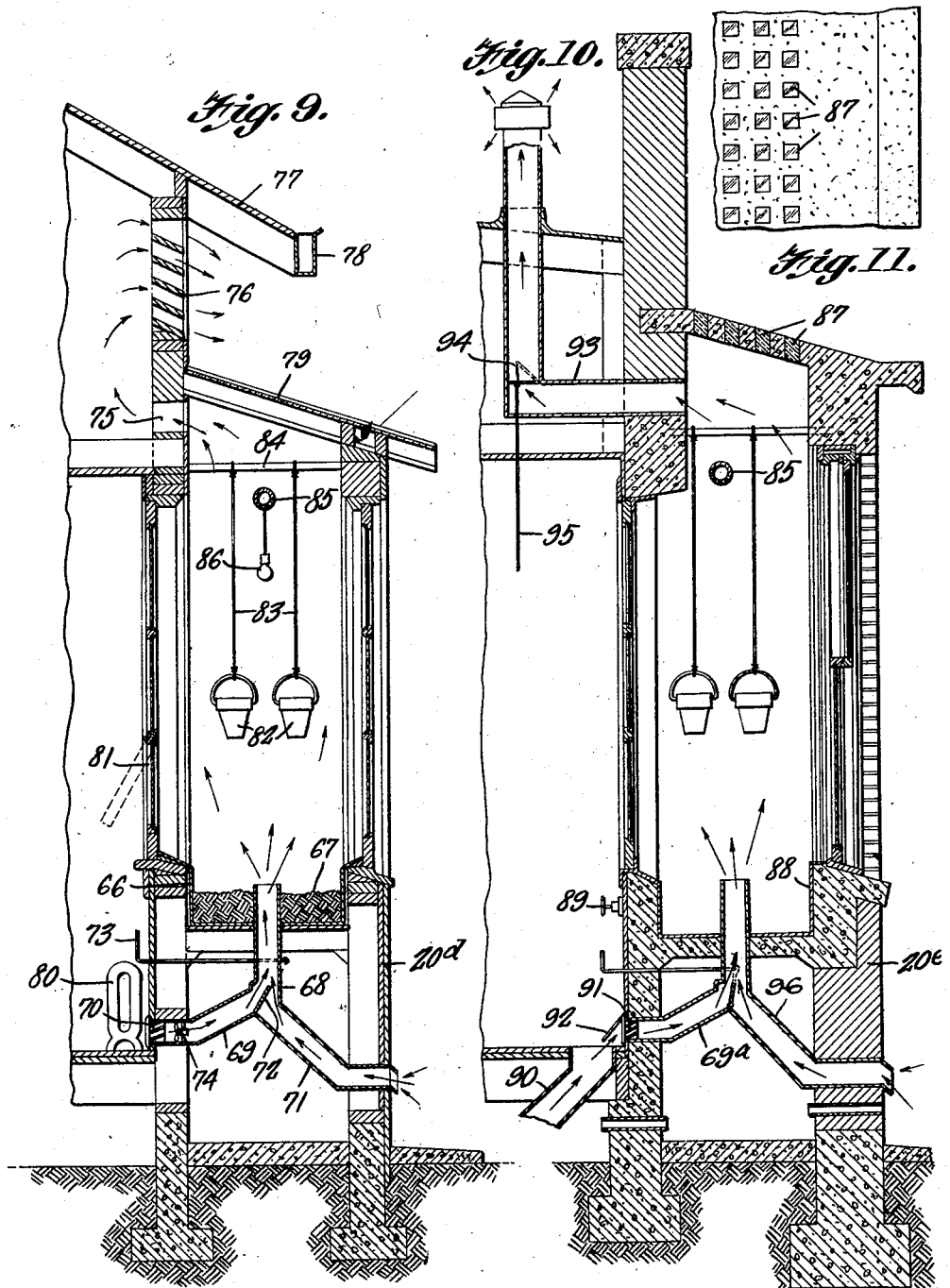

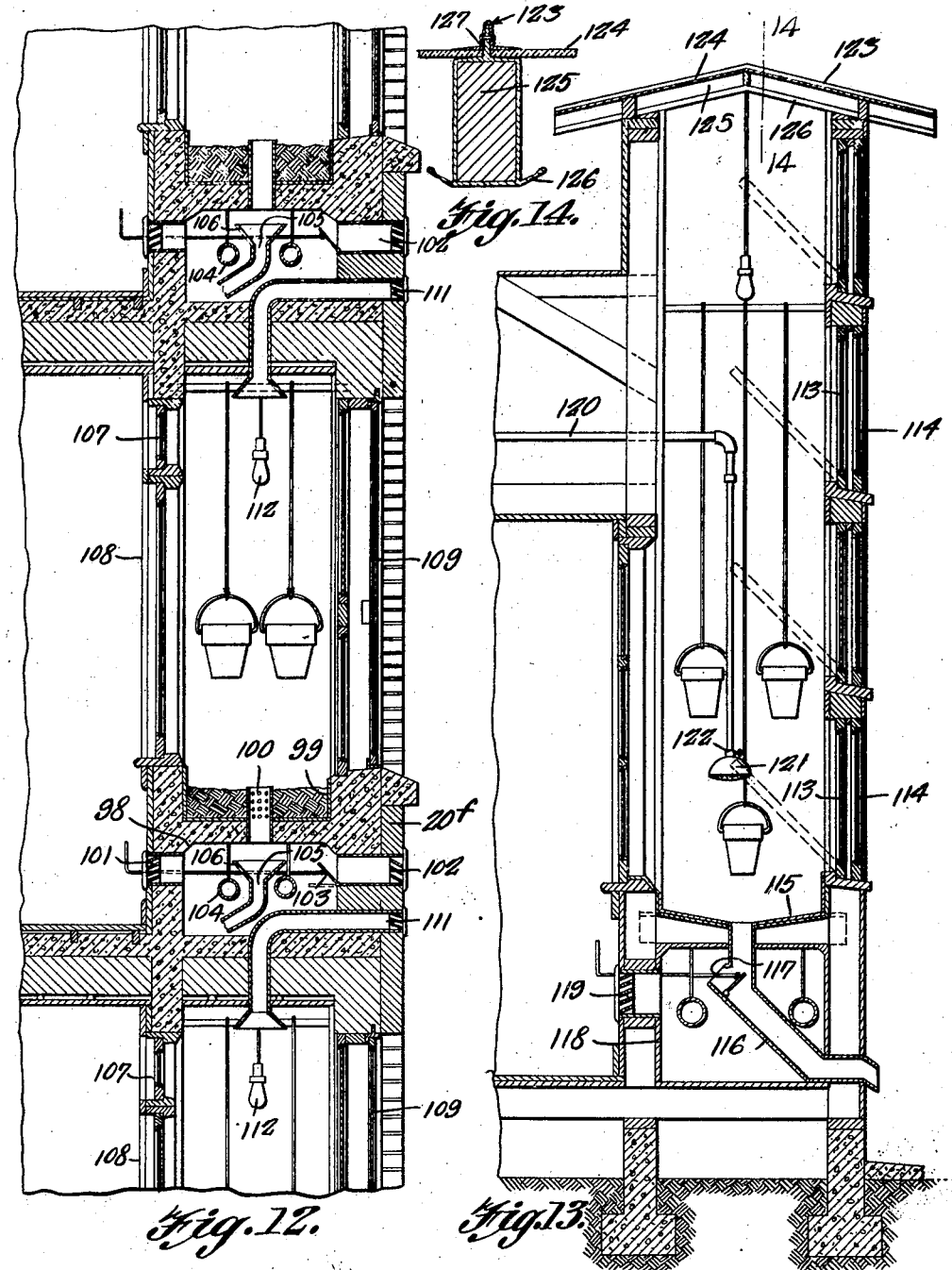

Patented June 17, 1930

1,765,154

UNITED STATES PATENT OFFICE

CARREL VERNON HEAD, OF SLATON, TEXAS

BUILDING CONSTRUCTION

Application filed December 2, 1927. Serial No. 237,552.

This invention relates to improvements in building construction, and has for an object the provision of means to provide space for and facilitate the growing of plants and pot flowers under proper conditions in restricted spaces, so that householders, apartment dwellers and others may have an indoor garden at a small cost and with a minimum amount of time and labor.

Another object of the invention is the provision of means for insuring proper and economical heating and ventilation, means being provided for utilizing the heat of a building for heating the garden enclosure.

Another object of the invention is the provision of means for supplying a proper amount of humidity for the plants in a pleasing and attractive manner, so that in addition to the function of supplying humidity, the attractiveness of the garden will be materially increased.

Another object of the invention is the provision of a ventilating means which provides for a circulation of air from the building through the garden enclosure so that a supply of fresh air may be provided for the building, while the carbon dioxide exhaled by the occupants of the building will be carried to the plants within the garden enclosure.

With the above and other objects in view, the invention further includes the following novel features and details of construction, to be hereinafter more fully described, illustrated in the accompanying drawings and pointed out in the appended claims.

In the drawings:—

Figure 1 is a horizontal sectional view showing a portion of a building constructed in accordance with the invention.

Figure 2 is a section on the line 2—2 of Figure 1.

Figure 3 is a view similar to Figure 1 showing a slightly different arrangement of garden enclosure.

Figure 4 is a fragmentary section taken substantially on the line 4—4 of Figure 3.

Figure 5 is a fragmentary elevation showing the corner of a building equipped with the invention.

Figure 6 is a horizontal sectional view of the same.

Figure 7 is a horizontal section showing a slightly different form of garden enclosure.

Figure 8 is a section on the line 8—8 of Figure 7.

Figure 9 is a vertical sectional view showing another form of the invention.

Figure 10 is a similar view showing another modification of the invention.

Figure 11 is a fragmentary plan view showing a portion of the roof of the garden enclosure illustrated in Figure 10.

Figure 12 is a vertical sectional view showing a garden enclosure arrangement for use in connection with apartment buildings or like structures in which a garden enclosure is provided for a number of floors.

Figure 13 is a sectional view showing a form of the invention wherein the enclosure extends above the eaves or regular plate line of the building.

Figure 14 is an enlarged fragmentary sectional view taken on the line 14—14 of Figure 13.

Figure 15 is a vertical sectional view showing another form of the invention.

Referring to the drawings in detail wherein like characters of reference denote corresponding parts, the form of the invention shown in Figures 1 and 2 comprises outwardly extending walls 20 which project from a main wall or main portion 21 of a building and provide an enclosure which opens into the main portion of the building. The walls are of suitable structure and are provided with windows to admit a sufficient amount of light and air for growing plants. These windows may be of any suitable type, the windows 22 at the ends of the enclosure being of the double hung type, while the windows within the outer wall may be of the casement type, as shown at 23. The enclosure is provided with an inner wall 24 having double hung windows 25 and casement windows 26, while located between this inner wall 24 and the main portion of the building is a floor 27. This floor is preferably lower than the floor 28 of the main portion of the building and a step 29 is provided between these floors. In this form of the invention, the garden enclosure opens into separate rooms divided by a partition 30, and a door 31 may be provided to divide the floor space 27.

The garden enclosure is provided along the outer wall with one or more soil boxes 32. These boxes may be formed of cement and suitably lined and their bottoms are preferably sloping toward a central opening 33. A conduit 34 leads from this opening and leading from this conduit is a branch pipe 35 which opens into the main building through a louver 36. An additional branch pipe 37 extends from the pipe 34 to the outside of the enclosure and has its outer end protected by a louver 38. A damper 39 is arranged at the juncture of the conduit 34 with the pipes 35 and 37 and this damper is controlled by means of a handle 40. By manipulating the handle 40, the damper may be positioned to provide the proper mixture of warm air from the main portion of the building with outside air, so that a temperature suitable for plants within the garden enclosure may be maintained. In addition, the soil boxes slope toward the opening 33 so that the conduit 34 and the pipe 37 provide a drain for the boxes and by properly positioning the damper 39 moisture may be prevented from passing through the pipe 35 into the interior of the building.

Located at each end of the enclosure is a compartment or receptacle 41. This receptacle is adapted to contain water so as to provide a fish pond and a pond for the accommodation of water plants. The attractiveness of the garden enclosure will thus be materially increased, and at the same time moisture from the water within the receptacles 41 will provide a proper amount of humidity for the plants. A suitable control drain 42 may be provided for each of the receptacles 41 and water may be supplied to these receptacles from a suitable source controlled by a spigot 43. Windows 44 of a suitable type may be provided at the ends of the receptacles 41 opening into the building, so that the attractiveness of the garden may be seen from the interior of the building.

The floor 27 may be arranged so as to slant toward a drain opening 45.

In Figures 3 and 4 of the drawings the garden enclosure 20ª opens into a room or building 46 through an arch 47. The inner wall 48 of the garden enclosure is provided with casement windows 49, while the outer wall may be provided with double steel windows 50 which are hinged as shown at 51. In this form of the invention, a substantially U-shaped soil box 52 is provided, while a water receptacle or fish pond 53 is located at each end of the soil box. Warm air is supplied to the garden enclosure from the interior of the room, while outside air is also supplied for mixture with the warm air after the manner previously described. This air enters the garden enclosure through openings 54 which are located at spaced intervals, while water may be supplied to the receptacles 53 and to the garden enclosure by spigots 55. In addition to the casement windows 49, windows 56 of any suitable type may be provided around the inner wall of the garden enclosure. As in the preceding form of the invention, the air supply pipes are protected by louvers 57.

In the form of the invention shown in Figures 5 and 6, the garden enclosure is arranged at one corner of a building 20ᵇ. The construction is substantially the same as that previously described, the difference residing mainly in the shape of the enclosure. In this form of the invention, the water receptacles or the fish ponds have been omitted, while the roof of the enclosure is provided with prism glass 58 for the admission of light. To add to the attractiveness of the enclosure, pots 59 are suspended from flexible members 60, for the accommodation of potted plants. These pots may be arranged behind the window opening so that the growing plants will present a pleasing and attractive view from the outside of the building.

In Figures 7 and 8, the garden enclosure 20ᶜ extends along one side of the building. As in the preceding forms of the invention, the enclosure opens into a room or building and is divided therefrom by a wall 62 having casement windows 63 and louver protected openings 64 for the passage of warm air. This air may be supplied from a suitable source such as radiators 65 located within the room.

In Figure 9 the enclosure 20ᵈ is shown as applied to a frame structure. The soil box 66 is constructed of suitable material, the soil line being indicated at 67. As in the preceding forms of the invention, a conduit 68 extends downwardly from the soil box and is in communication with a pipe 69 whose inner end opens through a louver 70 into the building. A pipe 71 also extends from the conduit 68 to the outside of the building so as to admit outside air. A damper 72 controls the admission of both warm and cold air and this damper is controlled by a handle 73. It is preferred to locate a fan 74 within the pipe 69 so that warm air may be forced through the pipe and provide a suction for outside air. This will create a suitable draft to carry off foul air through an opening 75 at the top of the enclosure, the air escaping from the building through a louver 76. The roof of the building may be provided with eaves 77 which carry a gutter 78 and this gutter is adapted to carry off water so as to prevent the latter from running down upon a skylight 79 provided in the top of the enclosure. Heat may be supplied from the building to the enclosure by a radiator 80, and the inner wall of the enclosure may have a casement window 81, which, when opened outward, will act as a deflector so as to deflect warm air from the radiator into the garden enclosure.

If desired, pots 82 may be suspended by means of flexible members 83 from rods or other suitable supports 84. A perforated water supply pipe 85 may be located in the top of the enclosure, for the purpose of watering the plants. An electric bulb 86 may be suspended from this pipe to supply desired illumination.

In Figure 10 the invention is shown as applied to a building constructed of masonry, the garden enclosure 20ᵉ being provided with a skylight 87. The soil boxes may be constructed of cement and water-proofed with pitch or asphalt 88. The water supply pipe 85 in this form of the invention may be provided with a suitable controlling member 89 placed in a readily accessible position. Hot air may be supplied from a furnace or other suitable heater through a pipe 90 and the louver 91 through which this air enters the pipe 69ᵃ, may be provided with a closure plate 92. This plate may be arranged to close the louver entirely or it may be arranged as shown so as to deflect hot air from the pipe 90 through the louver into the pipe 69ᵃ. In this form of the invention, foul air is carried off through a conduit 93 which extends through the roof and which is provided with a controlling damper 94 operated by means of a suitable operating member 95.

In the form of the invention shown in Figures 5 to 10 inclusive, the soil boxes are arranged at a proper height so that the attendant will not be required to bend into a tiring position to look after the flowers. A space is thus provided beneath the bottoms of the soil boxes through which the air pipes pass. In Figure 10, this space is also in communication with the atmosphere through a pipe 96, while the pipe 69ᵃ provides communication between this space and the interior of the building. A circulation of air may thus be provided in this space to prevent dampness.

In Figure 12, the invention is applied to a building such as an apartment house, or a hotel, a garden enclosure 20ᶠ being provided for each floor of the building. In this form of the invention, a space or compartment 98 is provided beneath the soil box 99, while a perforated pipe 100 extends upward into the soil box and has its lower end opening into the space 98. Warm air is admitted to this space from the interior of the building through a louver protected opening 101, while outside air is admitted through a similarly protected opening 102. A damper 103 is provided for regulating the admission of outside air. Heater pipes 104 may be hung within the space 98 so as to supply additional warm air when desired. A drain pipe 105 is arranged within the space 98 and has its upper flared end 106 arranged beneath the bottom of the pipe 100, so that water or moisture may be drawn from the soil box 99 and be carried off to a suitable point. A transom window 107 may be provided at the upper part of the inner wall 108 of the enclosure, while the windows of the outer wall may be protected by screens 109. Foul air is carried off through a conduit 111 from whose lower flared end there may be suspended an electric light 112.

In Figure 13, the garden enclosure extends above the eaves or regular plate line of the building. Its outer wall may be provided with inwardly opening casement windows 113 and screens 114 and the soil box may be provided with a suitable lining 115. A damper controlled pipe 116 extends from the outside of the enclosure and is provided with an opening 117 for the entrance of warm air supplied to the compartment 118 beneath the soil box, warm air entering this compartment through a louver protected opening 119.

A water supply pipe 120 extends into the upper portion of the garden enclosure and its lower end is provided with a shower or spray head 121, controlled by a valve 122. The top of the garden enclosure is protected by means of a roof constructed to provide a skylight 123. This roof is formed of glass panels 124 which are supported by beams 125 and the latter support gutters 126 to carry off water or moisture due to condensation, or leakage in the joints of the roof. The joints between the glass panels 124 are protected by flashings 127.

In Figure 15, the garden enclosure 20ᵍ extends above the roof of the main building. The general arrangement shown in this figure is somewhat similar to that disclosed in Figures 1 and 2, in that a floor 128 is provided which is reached from the floor 129 of the main building by means of steps 130. The soil box is indicated at 131 and a compartment 132 is located beneath this box. This compartment is provided with a warm air inlet 133 and an outside air inlet 134, the latter being controlled by a damper 135. The air is thus mixed within the compartment 132 and passes into the garden enclosure through a pipe 136. This pipe also provides a drain pipe so that excess moisture may pass outward through this pipe into a drain pipe 137.

From the foregoing description and accompanying drawings it will be seen that the invention provides an indoor garden wherein it is possible to accurately control ventilation and temperature, or to exclude either cold or warm air. In extremely cold weather, all of the windows upon the inner walls of the garden may be opened and the outside windows closed, so that the heat from the building will take care of the temperature of the garden, as the air vents will create a draft or circulation of air from the building through the garden enclosure and out through the roof. This provides for a supply of fresh air for the occupants of the building, while the carbon dioxide exhaled by the occupants will be carried to the plants. Both inside and outside windows may be closed and the air ducts arranged to provide proper heat and ventilation.

In moderately warm weather the outside windows may be opened and the inside windows closed, the interior of the building being closed against the wind or weather while fresh air and sunshine may be supplied to the garden enclosure. The arrangement and construction of the invention makes it possible for the housewife to attend to a large number of plants without undue labor or without soiling or littering up the floor of the house, as in the old sun room or conservatory. From the various forms of the invention shown it is evident that the invention may be adapted to practically any type of house or building.

The invention is susceptible of various changes in its form, proportions and minor details of construction and the right is herein reserved to make such changes as properly fall within the scope of the appended claims.

Having described the invention what is claimed is:—

1. In a building construction, a walled enclosure forming a part of the building and opening into the said building, a soil box, windows arranged within the walls of the enclosure, means to conduct warm air from the building into the enclosure through the soil box, means to conduct air from the outside of the building into the enclosure through the soil box, and means to control the supply of air.

2. In a building construction, a walled enclosure forming a part of the building and opening into the said building, a soil box, windows arranged within the walls of the enclosure, means to conduct warm air from the building into the enclosure through the soil box, means to conduct air from the outside of the building into the enclosure through the soil box, and means to control the supply of air and a moisture supply compartment within the enclosure.

3. In a building construction, a walled enclosure forming a part of a building and opening into the said building, a soil box, windows arranged within the walls of the enclosure, means to conduct warm air from the building into the enclosure through the soil box, combined means to conduct air from the outside of the building into the enclosure and to provide a drain from said enclosure, and means to control the supply of air.

4. In a building construction, a walled enclosure forming a part of a building and opening into the said building, a soil box, windows arranged within the walls of the enclosure, a pipe extending downwardly from the soil box, a branch pipe from the downwardly extending pipe and opening into the building to provide a warm air supply, a branch pipe extending from the downwardly extending pipe and opening to the atmosphere, and a damper located at the juncture of the pipes to regulate the air supply and deflect moisture outwardly through the atmospheric branch pipe.

In testimony whereof I affix my signature.

CARREL VERNON HEAD.